United States Patent [19]

Moses et al.

[11] 3,897,031

[45] July 29, 1975

[54] APPARATUS FOR PROVIDING SELECTED NAVIGATIONAL SYSTEM ENGAGE LOGIC

[75] Inventors: Willy B. Moses, Teaneck; Nathaniel N. Moore, Bergenfield, both of N.J.

[73] Assignee: The Bendix Corporation, Teterboro, N.J.

[22] Filed: Mar. 15, 1974

[21] Appl. No.: 451,409

[52] U.S. Cl. ...... 244/77 B; 235/150.22; 235/150.27; 244/77 A; 343/107
[51] Int. Cl. ............................................ B64c 13/20
[58] Field of Search ...................... 73/178 R, 178 T; 235/150.22, 150.26, 150.27; 244/77 A, 77 B, 77 E; 318/583; 340/27 R, 27 NA; 343/107

[56] References Cited
UNITED STATES PATENTS 3,361,391  1/1968  Medlinski .......................... 244/77 B
3,824,381  7/1974  Swern .......................... 244/77 A X Primary Examiner—Trygve M. Blix
Assistant Examiner—Stephen G. Kunin
Attorney, Agent, or Firm—Anthony F. Cuoco; S. H. Hartz

[57] ABSTRACT

For use with systems of the type including aircraft navigational beam transmitters and receivers, apparatus for providing logic for selectively engaging said systems by using a signal corresponding to the angular displacement of the aircraft from the beam centerline and a derived signal corresponding to the rate of change of the displacement, and which latter signal has been modified to eliminate noise while providing satisfactory performance at optimum beam displacement and essentially independent of the distance of the craft from the beam transmitter.

9 Claims, 2 Drawing Figures

APPARATUS FOR PROVIDING SELECTED NAVIGATIONAL SYSTEM ENGAGE LOGIC

BACKGROUND OF THE INVENTION

1. Field of the Invention

This invention relates generally to aircraft navigational systems such as VOR or ILS systems and particularly to means for selectively engaging said systems. More particularly, this invention relates to means for generating logic for selectively engaging said systems at an optimum displacement of the aircraft from the centerline of a transmitted navigational beam and independent of the distance from the beam transmitter.

2. Description of the Prior Art

An aircraft is controlled in response to beams generated by VOR, ILS and like navigational systems so that the craft follows the centerline of the beam. The aircraft may initially approach the beam centerline while in any compatible mode of flight such as pre-select heading. The selected navigation system is manually armed and automatically engages when a predetermined logic condition has been satisfied. The required logic has traditionally been implemented as a function of angular beam offset and an approximation of beam rate. Both of these implementations have inherent deficiencies which result in system performance being dependent on the distance from the beam transmitter, since approximations have been utilized in lieu of deriving true angular beam rate from a noisy transmitted beam signal. This condition is most apparent when the VOR system is selected in that the distance from the transmitter at which a beam capture maneuver must be initiated varies from as close as 5 nautical miles to as far as 150 nautical miles.

SUMMARY OF THE INVENTION

This invention contemplates apparatus responsive to a signal corresponding to the displacement of an aircraft from the centerline of a navigational beam (beam displacement) for providing a signal corresponding to the rate of change of said displacement (beam rate). The beam displacement signal is isolated and the isolated signal is applied to a lag filter which attenuates beam noise due to high frequency components of the beam displacement signal and due to reflections from interfering aircraft or other obstructions. An equation having a constant which is the ratio of beam rate signal gain to beam displacement signal gain for the selected navigational system is solved to provide a theoretical point in space at which the selected navigational system will engage for asymptotic acquisition of the beam centerline. The beam rate signal is derived by passing the filtered beam displacement signal through a high pass filter and limiting the filtered signal to minimize the peak amplitude of beam noise. This limit is selected to be above the maximum amplitude of beam rate generated by aircraft maneuvering. The limited beam rate signal is applied to a low pass filter which averages the rate signal to minimize the noise content therein. The averaged signal is monitored to determine the relative distance from the beam transmitter. High average rate signal indicate close proximity to the transmitter while low average rate signals indicate that the aircraft is at a further distance from the transmitter. At the further distances the filtered signal is gain adjusted and summed with the beam displacement signal. At closer distances the filtering is bypassed. The summed signal is sensed to generate logic for engaging the selected navigational system.

One object of this invention is to provide apparatus for selectively engaging navigational systems at optimum displacement from the centerline of a beam transmitted by the selected system and essentially independent of the distance from the beam transmitter.

Another object of this invention is to provide means of the type described, and applicable to VOR, ILS and like systems.

Another object of this invention is to provide means of the type described wherein Distance Measuring Equipment (DME) is not required.

Another object of this invention is to provide means of the type described having beam capture capability at short distances from the beam transmitter such as may be necessary for satisfactory operation of VOR navigational systems.

Another object of this invention is to provide means of the type described which provide navigational system engagement as a function of beam displacement and derived beam rate.

Another object of this invention is to minimize beam overshoot during the beam capture maneuver.

Another object of this invention is to eliminate complex turn maneuvers at shallow intercept beam capture conditions.

Another object of this invention is to provide means of the type described and wherein false navigation system engagement due to beam noise is minimized.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
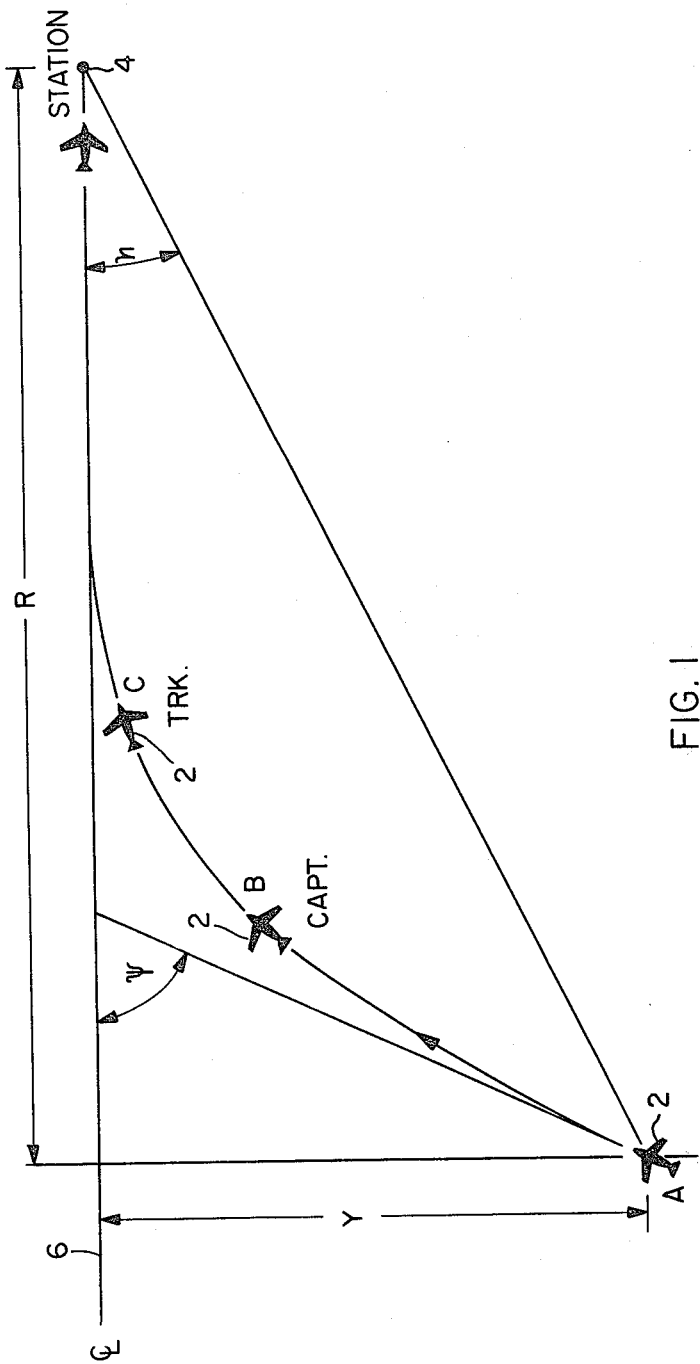
FIG. 1 is a diagrammatic representation showing the geometry of the navigational problem that the device of the invention is intended to resolve.

With reference to FIG. 1, an aircraft 2 is initially at a point A, at a range R and at a linear displacement Y from a ground base station 4 having a VOR, ILS or the like transmitter which transmits a navigational beam having a centerline 6. Aircraft 2 is flying at a heading $\psi$ and is at an angular displacement $\eta$ from beam centerline 6.

Aircraft 2 is controlled through an automatic flight control system such as an autopilot or flight director to capture the beam at a point B and to thereafter (point C) track the beam. Aircraft 2 usually follows the centerline of a VOR beam to pass station 4 and thereafter follows the same or another VOR beam to pass another station (VOR station passage), and so on until a destination is reached. The aircraft follows an ILS (localizer) beam to touchdown prior to reaching station 4.

Figure 2:
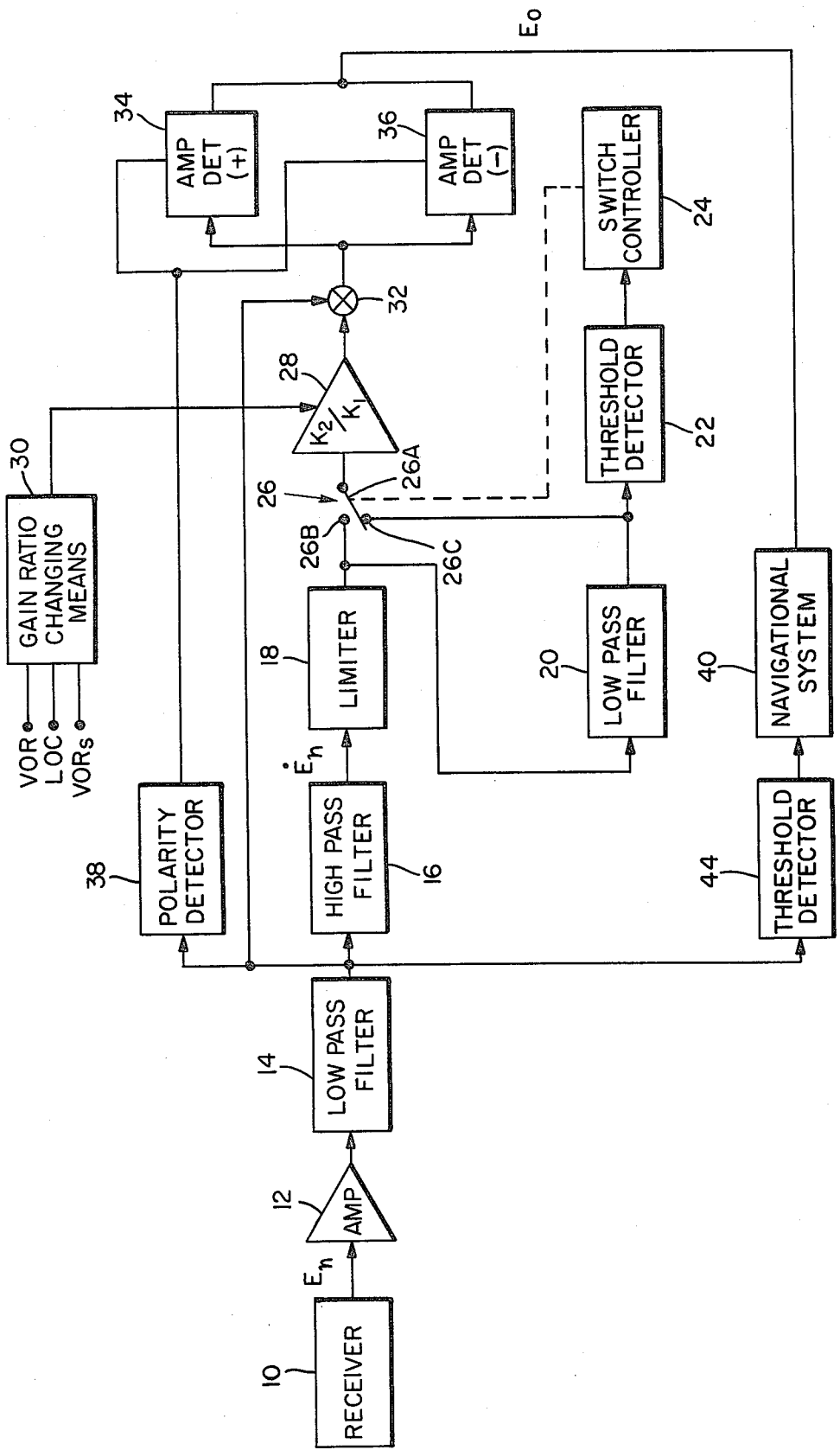
FIG. 2 is a block diagram of the system of the invention and showing the signal flow through the computational paths to the generation of logic for selective navigational system engagement.

As shown in FIG. 2, a VOR, ILS or the like receiver 10 suitably mounted in aircraft 2 provides a signal $E_\eta$ corresponding to the angular displacement of aircraft 2 from beam centerline 6. Signal $E_\eta$ is applied to an isolation amplifier 12 which provides an isolated beam displacement signal. The isolated signal is applied to a low pass filter 14 which strongly attenuates signal variations due to high frequency components and due to reflections of the signal from interfering aircraft or other obstructions.

The signal from low pass filter 14 is applied to a high pass filter 16 which provides a beam rate signal $\dot{E}_\eta$. Beam rate signal $\dot{E}_\eta$ is limited by a limiter 18, the E of which is such that the limited signal has a minimum peak amplitude of beam noise. The limit is selected to be above maximum amplitudes of beam rate generated by aircraft maneuvering.

The characteristics of beam noise at long distances from station 4 have been found to be of similar amplitude and frequency to the beam rate signals generated by aircraft maneuvers relative to beam centerline at shorter distances from station 4. In order to obtain useable beam rate information at all distances from the transmitter, the limited beam rate signal from limiter 18 is applied to a low pass filter 20 which averages the limited rate signal to minimize noise content. The average signal from low pass filter 20 is monitored by a threshold detector 22 which determines the relative distance of aircraft 2 from station 4. High average rate signals indicate close proximity to the station while lower average rate signals indicate that aircraft 2 is at a further distance from station 4.

Threshold detector 22 drives a switch controller 24 which actuates a switch 26 so that the arm 26A thereof is connected to a terminal 26B or to a terminal 26C as the case may be.

Thus, when the average beam rate signal is below a predetermined threshold, the output of threshold detector 22 drives switch controller 24 which actuates switch arm 26A to switch terminal 26C as shown in FIG. 2, whereby the signal from limiter 18 is first filtered by filter 20 and then gain scheduled by a gain scheduling device 28. When the average rate signal from low pass filter 20 is above the threshold, threshold detector 22 operates switch controller 24 so that switch arm 26A is connected to terminal 26B whereby the limited beam rate signal is directly applied to gain scheduling device 28 without first being filtered by filter 20.

In this connection it is noted that gain scheduling device 28 adjusts the gain of the signal applied thereto by the ratio of beam rate gain $K_2$ to beam displacement gain $K_1$ so that beam displacement and beam rate are related in accordance with the following equation:

$$\eta = -\frac{K_2}{K_1} \dot{\eta} \quad (1)$$

When equation (1) is satisfied the navigational system is engaged, i.e. point B in FIG. 1, to provide asymptotic capture of beam centerline 6. The gain ratio is changed for the navigational system selected, i.e. VOR or ILS and a system sub-mode such as VOR station passage (VOR$_s$) as will hereinafter be discussed. This is accomplished through a gain changing ratio means 30 which is engaged by the pilot of aircraft 2 to select a particular navigation system prior to the beam capture maneuver. Means 30 provides a signal which is applied to gain scheduling device 28 to change the gain ratio commensurate with the navigational system selected.

The output of gain adjustment device 28 is applied to a summation means 32 and summed thereby with the filtered beam displacement signal from filter 14. The output from summation means 32 is applied to a uni-polarity amplitude detector (+) 34 and to a uni-polarity amplitude detector (−) 36. The filtered beam displacement signal from filter 14 is applied to a polarity detector 38 which provides a signal at a "high" logic level (1) when the signal from filter 14 is of one polarity and provides a signal at a "low" logic level (0) when the filtered signal is of the opposite polarity in accordance with the direction from which aircraft 2 is approaching beam centerline 6.

When polarity detector 38 provides, for example, the logic "high" signal, uni-polarity amplitude detector 34 is actuated to provide one logic signal and when polarity detector 38 provides the low logic signal detector 36 provides another logic signal. The one or the other logic signals are applied as signal $E_0$ to engage a navigational signal system 40 which may be, as heretofore noted, a VOR, ILS or like system for capturing beam centerline 6 at point B (FIG. 1). The use of polarity detector 38 provides for engagement of the selected navigational system at any time after having passed the threshold for a particular flight condition up until crossing beam centerline 6. After passing through the beam centerline, system engagement is inhibited for conditions that would preclude beam capture, with reasonable operational conditions. This feature provides the pilot of the aircraft with the option of late selection of the desired navigational system with slight degradation of performance, while protecting against unacceptable aircraft maneuvering.

Additionally, after the pilot of aircraft 2 selects a navigational system, the signal from low pass filter 14 is applied to a threshold detector 44. When the filtered signal is below a predetermined threshold, threshold detector 44 provides a signal which is applied to navigational system 40 to provide system engagement regardless of the closure rate of aircraft 2 on beam centerline 6.

This feature is provided to allow the pilot of aircraft 2 to manually place the aircraft on beam center and to engage the selected system without risking system non-engagement because of beam rate due to noise.

VOR system passage (VOR$_s$) heretofore referred to is automatically engaged when the summation of the beam rate and beam displacement signals exceeds a predetermined level after VOR system engagement as determined by the signal from summation means 32. The contribution of beam rate after beam tracking is the minimization of aircraft divergence from beam center prior to control path softening. The switch over level is selected to indicate beam activity that exceeds normal operating levels which may be expected to occur during the beam tracking maneuvers.

It will now be seen from the aforegoing description of the invention that the heretofore noted objects have been achieved. The system of the invention provides navigational system engage logic, and which logic is implemented using a derived beam rate signal which has been modified to eliminate beam noise while allowing satisfactory system performance at small distances from station 4.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Apparatus for providing a signal which engages an aircraft navigational system selected by the pilot of the craft from systems of the type which transmit and receive navigational beams, comprising:

receiver means for providing a signal corresponding to the displacement of the aircraft from the centerline of the beam transmitted by the selected system;

means for providing a signal corresponding to the rate of change of the displacement;

means for limiting the displacement rate signal;

means connected to the limiter for adjusting the gain of the limited displacement rate signal in accordance with a predetermined ratio of displacement rate signal gain to selective navigation system displacement signal gain;

means for changing the gain adjustment in accordance with the selected navigational system;

means for combining the limited, gain adjusted displacement rate signal and the displacement signal; and means connected to the combining means and responsive to the combined signal for providing a signal for engaging the selected navigational system.

2. Apparatus as described by claim 1, including:

averaging means connected between the limiting means and the gain adjusting means for averaging the limited displacement rate signal;

switching means connected to the limiting means, the averaging means and the gain adjusting means; and means connected to the averaging means and responsive to the averaged limited displacement rate signal for actuating the switching means to disconnect the limiting means from the gain adjustment means and for connecting the averaging means to the gain adjustment means when the averaged signal is below a predetermined level, and for disconnecting the averaging means from the gain adjustment means and for connecting the limiting means to the gain adjusting means when the averaged signal is above said level.

3. Apparatus as described by claim 1, wherein the means connected to the combining means and responsive to the combined signal for providing a signal for engaging the selected navigational system includes:

first means connected to the beam displacement signal means and responsive to the signal therefrom for providing a signal in accordance with the direction from which the aircraft is approaching the beam centerline; and second means connected to the combining means and to the first means and responsive to the signal from the first means and the signal from the combining means for providing the system engage signal.

4. Apparatus as described by claim 1, including:

means for isolating the beam displacement signal; and means for filtering the beam displacement signal to attenuate beam noise.

5. Apparatus as described by claim 4, wherein the means for providing a signal corresponding to the rate of change of the displacement includes:

other filtering means connected to the first mentioned filtering means for filtering the signal therefrom to provide the rate signal.

6. Apparatus as described by claim 4, wherein the second means includes:

means connected to the combining means and to the first means and responsive to the signal from the first means and the signal from the combining means in one sense for providing the system engage signal; and means connected to the combining means and to the first means and responsive to the signal from the first means and the signal from the combining means in an opposite sense for providing the system engage signal.

7. Apparatus as described by claim 1, including:

means connected to the beam displacement signal means for detecting the level of the signal therefrom, and for providing a system engage signal when said level is below a predetermined level.

8. Apparatus as described by claim 1, wherein the means for combining the limited, gain adjusted displacement rate signal and the displacement signal includes:

means for summing said signals.

9. Apparatus as described by claim 1, wherein:

the means connected to the combining means and responsive to the combined signal for providing a signal for engaging the selected navigational system provides said engage signal when the following equation is satisfied:

$$\eta = -\frac{K_2}{K_1}\dot{\eta}$$

wherein, $\eta$ = beam displacement, $\dot{\eta}$ = displacement rate, $K_2$ = displacement rate gain and $K_1$ = selective navigation system displacement gain.

* * * * *